United States Patent [19]

Cleary et al.

[11] 4,204,149
[45] May 20, 1980

[54] ELECTRONIC CONTROLLED-DURATION SWITCHING

[76] Inventors: James J. Cleary, 1828 S. Magnolia Ave., Yuma, Ariz. 85369; John M. Cleary, 426 Washington Valley Rd., Martinsville, N.J. 08836

[21] Appl. No.: 816,739

[22] Filed: Jul. 18, 1977

[51] Int. Cl.² .................. H05B 39/02; H05B 39/04
[52] U.S. Cl. .................... 323/24; 307/141.4; 315/360
[58] Field of Search ............... 323/225 C, 24; 307/252 B, 141, 141.4; 58/152 B, 24 A, 33; 340/309.1, 322, 332, 635, 640, 641; 315/360, 209 R, 209 SC

[56] References Cited

U.S. PATENT DOCUMENTS

| | | | |
|---|---|---|---|
| 3,491,283 | 1/1970 | Johnston | 323/225 C |
| 3,581,300 | 5/1971 | Eloranta | 340/322 |
| 3,733,528 | 5/1973 | Gilbreath | 323/24 |
| 3,925,688 | 12/1975 | Kalfus | 323/24 |
| 3,940,660 | 2/1976 | Edwards | 307/141 |
| 3,979,601 | 9/1976 | Franklin | 307/141 |
| 3,979,740 | 9/1976 | Forbat et al. | 340/309.1 |
| 4,008,415 | 2/1977 | Serafin et al. | 315/360 |
| 4,037,135 | 7/1977 | Novey | 323/24 |
| 4,103,294 | 7/1978 | Stettner et al. | 340/309.1 |
| 4,104,541 | 8/1978 | Jewell | 58/33 |

Primary Examiner—A. D. Pellinen
Attorney, Agent, or Firm—George E. Kersey

[57] ABSTRACT

Electronic restoration of switching to an "off" condition at the end of a prescribed and controllable time interval, with an indication of termination being provided before the end of the interval. The electronic circuitry for controlling the switching can be substantially integrated to permit compact, small space installation in, for example, the housings of conventional mechanical switches.

10 Claims, 11 Drawing Figures

ELECTRONIC CONTROLLED-DURATION SWITCHING

BACKGROUND OF THE INVENTION

This invention relates to switching and, more particularly to the switching of lights and individual appliances.

Switches are commonly employed to control energy applied to devices. The typical switch has an actuator, such as a manual toggle, with distinctive "on" and "off" positions. Once the switch is turned "on", it typically remains in that condition until someone turns it off.

Unfortunately, switches are often left on long after there is any need for the devices they control. This is particularly true for lights and small appliances. This is frequently due to the fact that the user has moved from the location of the switch and is no longer convenient for him to turn it off. The result is a waste of energy and unnecessary use of the controlled device.

Accordingly, it is an object of the invention to provide for the automatic de-energization of switches that have been left on inadvertently. A related object is to provide for the de-energization of switches with conventional toggle actuators, as well as other forms of actuators.

Another object of the invention is to provide for the automatic de-energization of household switches. A related object is to achieve automatic de-energization in switch boxes used for household switching.

Still another object is to provide automatic or manual de-energization at the option of the user. A companion object is to permit the reactivation of an automatically de-energized switch at any time during the operating cycle of the switch.

A further object of the invention is to provide an indication that the switch is about to be de-energized.

SUMMARY OF THE INVENTION

In accomplishing the foregoing and related objects, the invention provides for the automatic de-energization of an operator manipulated switch at the end of a prescribed time interval. The switch can have distinctive "on" and "off" positions associated with respective operated and non-operated conditions. Switches in accordance with the invention can be deactivated even if their actuators remain in their "on" positions.

Once deactivated, the switch is reactivated by toggling its actuator or otherwise moving it from its "on" to the "off" to the "on" position. This brings about switch activation for a further time interval.

The time interval during which the switch is activated is regulated by an electronic controller with acts on an electronic switch such as a triac. The controller and the electronic switch can be implemented in a wide variety of ways.

In accordance with one aspect of the invention, the electronic controller is actuated from the same power line that is connected to a working device through the switch. When the operator manipulated portion of the switch is in an "on" position, a suitable energizing signal is applied to the electronic controller. Upon being energized, the electronic controller acts on an electronic switch, such as the gating terminal of a triac, to connect the power line to the load. The electronic switch subsequently becomes non-conducting, as determined by the electronic controller, after the elapse of a prescribed actuation interval.

In accordance with another aspect of the invention, the actuating or biasing signals for the electronic controller are provided by a rectifier which is connected in series with the controller.

In accordance with a further aspect of the invention, the rectifier is connected to the controller through a bridge that controls the gating terminal of a triac switch.

In accordance with a still further aspect of the invention, the bridge is in the form of a full-wave diode bridge which is shunted by a silicon-controlled rectifier to accomplish the desired control over the triac gating terminal.

In accordance with yet another aspect of the invention, the bridge is of the full-wave diode type with two of the diodes replaced by individually controllable silicon-controlled rectifiers.

In accordance with still another aspect of the invention, the bridge that controls the triac is operated from a counter.

In accordance with an additional aspect of the invention, the counter is enabled by a clock which is locally energized. The clock can provide a blinking effect preparatory to de-actuation of the electronic switch at the end of a desired count. The blinking provides a visual indication that the switch is about to be deactuated.

In accordance with an alternative aspect of the invention, the power level of the controlled object is reduced preparatory to a termination of actuation at the end of a prescribed interval. The reduction in power level also serves as an indicator that switch deactuation is to follow. It can be achieved by controlling the extent of conduction of the electronic switch.

In accordance with a general aspect of the invention an electrical control system is provided in which an energy source is connectable to a load for a prescribed interval through an electronic switch, such as a triac. The electronic switch is operated by a controller which is in turn activated from a biasing source triggered to operate for a prescribed interval and is near the beginning of each such interval.

Triggering can be accomplished from the biasing source or from a load detector. The latter is particularly suitable for assuring that the controller will be triggered, i.e. reset, at the commencement of operation of the electronic switch. The load detector can be in series or in shunt with the load. It indicates when a prescribed change in signal level, consonant with the commencement of a desired operation interval, has taken place.

The load detector can take the form of a sample and hold circuit in which signal samples are supplemented and compared with ensuing samples in order to provide an indication of when a resetting signal level has occurred.

The controller is operable by a clock with internal timing components such as resistors, capacitors and steering diodes. A steering diode is employed to produce pulse trains with unequal pulse width and pulse separation intervals. The steering diode is eliminated when the pulse train is to have equal pulse width and separation intervals.

Alternatively the clock signal can be derived directly from the same energy source that is controllable by an electronic switch in accordance with the invention. A counter energized from the source has separated stages which are used to control a resetting gate to produce a suitable clock pulse train.

The controller may also employ various combinations of counters, as well as a microprocessor.

DESCRIPTION OF THE DRAWINGS

Other aspects of the invention will become apparent after considering several illustrative embodiments taken in conjunction with the drawings in which.

DETAILED DESCRIPTION

Figure 1:
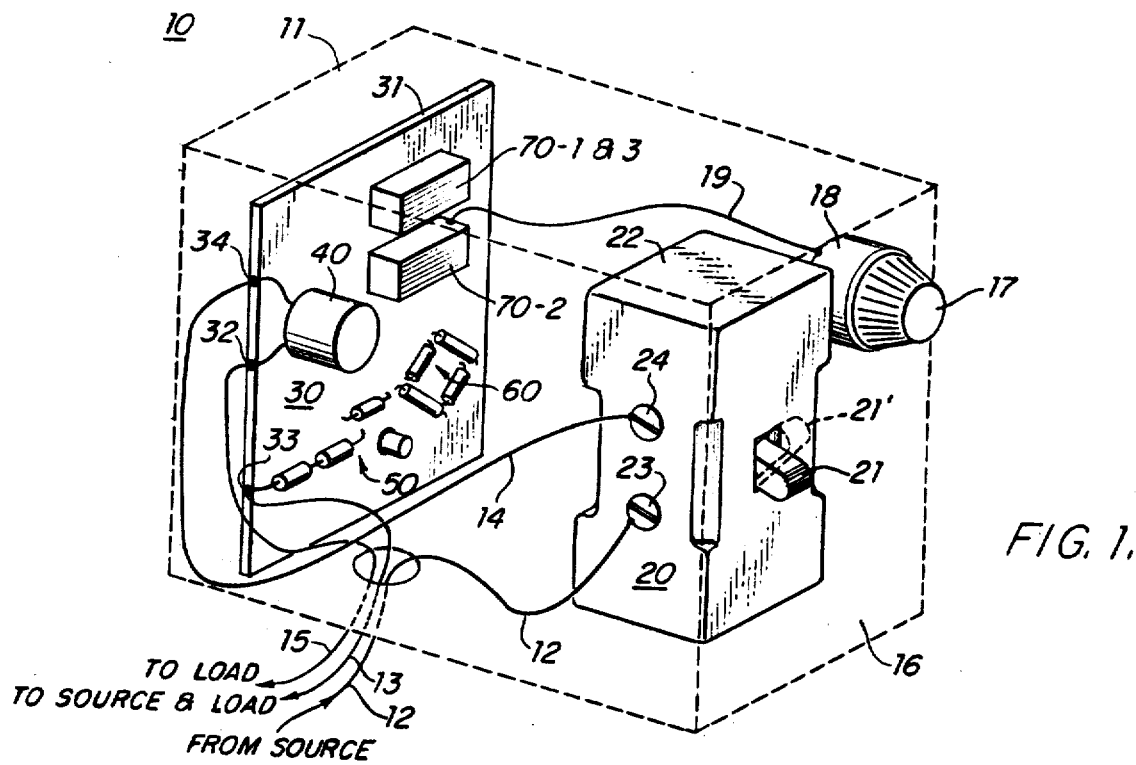
FIG. 1 is a perspective view of an electronically controlled switch with a mechanical toggle in accordance with the invention.

Turning to the drawings, an electronic duration switch 10 in accordance with the invention is shown in overall configuration in FIG. 1.

The switch 10 is illustratively encased in a housing 11 that can be accommodated by the kind of wall receptacle commonly used to control household lights. The principal operating constituents of the switch 10 are a toggle switch 20 with an actuator 21 and an electronic switching circuit 30.

The illustrative mechanical swtich 20 in FIG. 1 has a toggle 21 that is pivotable about a pin within a casing 22. Alternatively the toggle 21 can be journelled in opposite walls of the housing 11. The mechanical switch 20 and the associated toggle 21 are of conventional construction.

The switching circuit 30 is formed principally by an electronic switch 40 which is illustratively and advantageously in the form of a triac, a biasing network 50, a bridge network 60 and control components 70 for the triac switch 40. The various components 40, 50 and 60 of the switch 30 are mounted in standard fashion on a circuit board 31 which is conveniently inserted within the mechanical switch housing 11.

A lead 12 from an external power source (not shown) is connected to one terminal 23 of the mechanical switch 20. The opposite lead 13 from the external power source is connected jointly to one terminal of the load (not shown) and to a terminal 33 of the printed circuit board 31. The other terminal 24 of the mechanical switch 20 is connected by a lead 14 to a terminal 34 of the printed circuit board. The other terminal of the load is connected by a lead 15 to a terminal 32 of the printed circuit board.

To operate the electronic controlled-duration switch of FIG. 1, the mechanical switch 20 is placed in its closed or "on" condition, e.g. by elevating the toggle 21 which protrudes through a front panel 16 of the housing 11, to the phantom position 21'. This provides a path for the flow of current from the lead 12 of the source through the switch 20 to the triac switch 40 over lead 14. The other side of the triac 40 at terminal 32 is connected to the other side of the load by the lead 15. Consequently, when the triac 40 is activated there will be a complete circuit for the flow of current upon actuation of the mechanical switch 20. The desired control over the triac 40 is accomplished through the biasing source components 50 and the control components 60 and 70. Closures of the mechanical switch 20 also applies the external power source to the biasing components. This in turn acts upon the control components 60 and 70 which gate the triac 40 to permit the desired flow of current into the load.

At the end of a prescribed time interval which is externally setable from the panel 16 using the setting knob 17 the triac 40 is disabled with the result that even with the mechanical switch 20 in its "on" position, current flow to the load will terminate. To re-energize the external load, it is only necessary to open the mechanical switch 20, terminating the bias to the control components 60 and 70. Subsequently when the mechanical switch 20 is returned to its "on" position the bias is re-established and the prior operating cycle is re-established.

The setting knob 17 operates a multicontact switch 18 which is connected to the control component 60 over a cable 19.

The control component 60 also provides an indication of when the power to the load is about to be terminated. This is accomplished in a variety of ways, for example by pulsing the load or by reducing its voltage level.

During the ensuing blinking or reduced power interval a user in the room can go to the switch 20 and operate the toggle 21 (by moving it from its closed to its open and then to its closed position) to re-establish the operating cycle for another controlled interval. If the user wishes, he can even disengage the controller by moving the setting knob 17 to its disengagement position.

Figure 2:
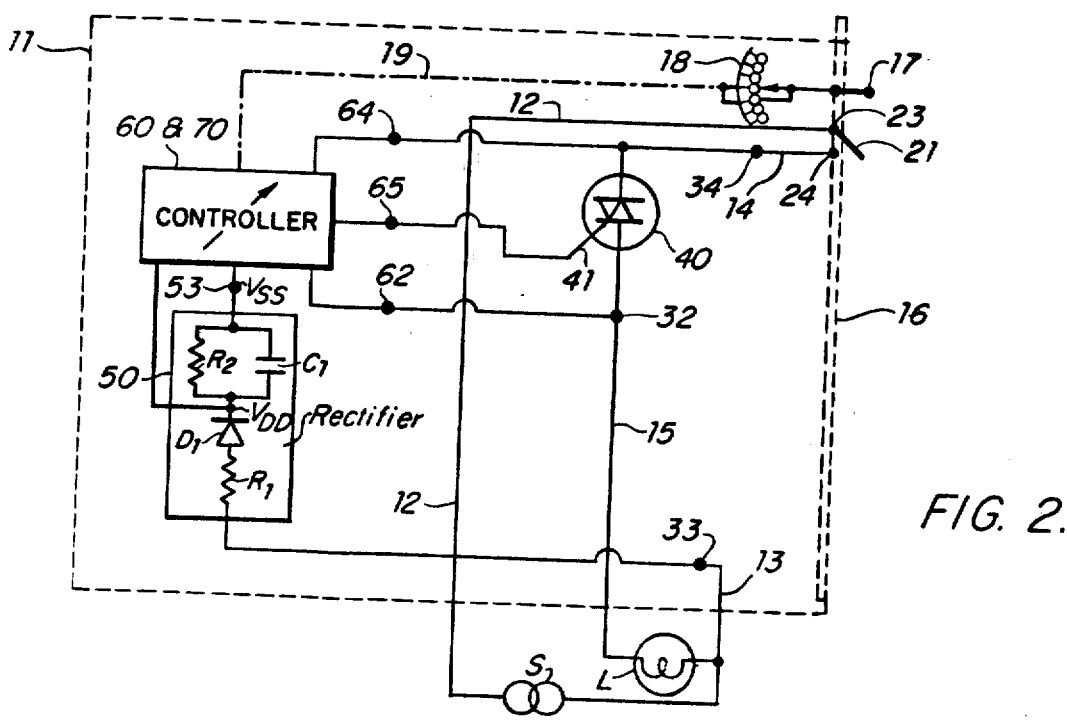
FIG. 2 is a shcematic and block diagram representation of the switch of FIG. 1.

A schematic representation of the switch 10 of FIG. 1 is shown in FIG. 2. The triac electronic switch 40 is able to pass current in both directions under the control of a gating element 41. Consequently if the gating element 41 is properly biased by the controller 60 and 70, current can pass from the source S through the closed toggle 21 into the triac 40 and into the load L. Closure of the toggle 21 also applies the voltage of the source S across terminals 33 and 34 to allow the rectifier 50 to develop a biasing signal for operating the controller 60 and 70. At the end of a prescribed time interval as determined by adjustment of the setting member 17, the gate element 41 of the triac 40 is no longer active and the triac 40 becomes an open circuit, thus disconnecting the load L from the signal source S notwithstanding that the mechanical switch 20 remains in its "on" position.

Figure 3A:
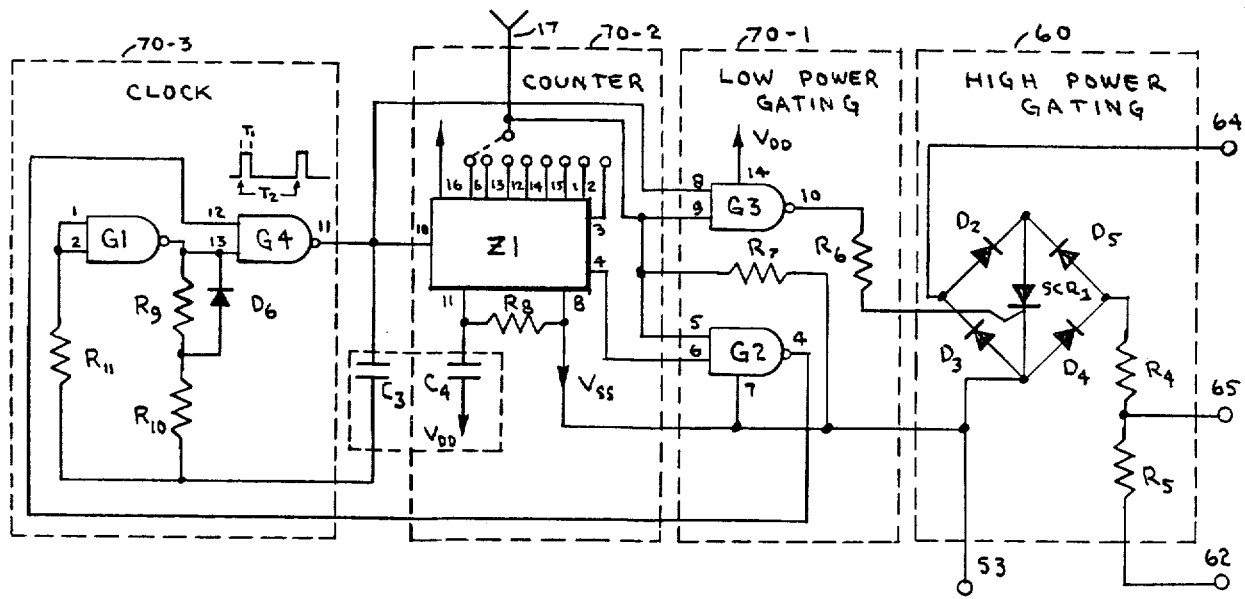
FIG. 3A is a schematic diagram of one type of control circuitry for the electrical control system of FIGS. 1 and 2.

Details for one form of bridge and control circuitry for the triac 40 are shown in FIG. 3A.

The circuitry of FIG. 3A includes high power gating elements 60, low power gating elements 70-1, a counter network 70-2, and a clock network 70-3.

The high power gating elements 60 of FIG. 3A, which control the triac 40 of FIG. 2 over lead 41, take the form of a bridge of diodes D2 through D5, which are poled for full wave rectification. The bridge is shunted by a silicon-controlled rectifier $SCR_1$. When the toggle 21 of FIG. 2 is closed, current flows through the components $R_1$, $D_1$, $R_2$ and $C_1$ of the rectifier 50 returning to the signal source S through the Diode D3 of the bridge on positive half cycles of the signal applied to the lower printed circuit control terminal 33.

Thus whether or not the triac 40 is enabled or disabled, there will be half wave rectification provided by the combination of the diodes $D_1$ and $D_3$ and the filter $C_1$, $R_2$. The resistor $R_1$ acts as a current limiter. The resistor $R_2$ may be substituted by a Zener diode, with its anode connected to terminal 53, for enhanced control over bias voltage $V_{DD}$.

The components of the controller are desirably of a metal-oxide-silicon type for which a bias or "drain" voltage $V_{DD}$ which is supplied at the junction of the diode $D_1$ and the filter element $C_1$, $R_2$ of the rectifier 50. The opposite end of the filter $C_1$, $R_2$ is at the reference or "substrate" level $V_{ss}$.

As long as the silicon-controlled rectifier $SCR_1$ is operated, there will be a suitable gating signal for the triac 40. On the positive half cycles with respect to the upper circuit board terminal 34, current flow is through the bridge diode $D_2$. During the ensuing negative half cycles, when the terminal 34 is negative, current flow is though the bridge diode $D_3$. When the silicon-controlled rectifier $SCR_1$ is turned off, there is no longer a current path to maintain the biasing of the triac 40, and it becomes an open circuit with the result that power is no longer supplied to the load L.

Illustrative control circuit for the bridge 60 of FIG. 3A is provided by a counter 70-2 which operated by a clock 70-3 to operate the bridge 60 through low power gates 70-1. The principal counter consitituent is advantageously an integrated circuit chip $Z_1$, which is shown mounted 70-2 on a board 21 of FIG. 1. Such a counter chip Z is illustratively a fourteen bit CMOS (Complimentary symmetry-metal-oxide-silicon) element of the C04020 type. The counter 70-2 acts on the bridge 60 through two gates G2 and G3 which are advantageously constituents of a second integrated circuit chip of the CD4011 type known as a CMOS Quad with (four) NAND gates. Two NAND gates of the Quad are the gates G2 and G3 between the counter 70-2 and the bridge 60. The remaining two gates G1 and G4 of the Quad are used in the clock 70-3 to operate the counter 70-2.

When the toggle 21 is operated, the rectifier 50 immediately produces a bias signal $V_{DD}$ for the various components, power gates 70-1, the counter 70-2 and the clock 70-3. The output from the NAND gate G3 is immediately at the bias level $V_{DD}$ causing the silicon-controlled rectifier $SCR_1$ of the bridge to be operated through the resistor $R_6$. The reason is that the NAND gate G3 has input terminals 8 and 9 and the input at terminal 9 will be at a comparatively zero level of $V_{SS}$ until a prescribed count is reached by the counter 70-2. A NAND gate has the characteristic that its output will be at the bias level $V_{DD}$ as long as one or both of its inputs is at a comparatively zero level. However, its output reaches the $V_{SS}$ or relatively zero level when both of its inputs are at the bias level.

Since the initial level at pin 9 of NAND gate G3 is at the relatively zero level, there will be a similar input at pin 5 of the companion NAND gate G2. This is assured by the direct connection through the resistor $R_7$ to the terminal 53 which is at the $V_{SS}$ level of the rectifier 50 in FIG. 2.

The bias level output of the control NAND gate G2 serves to enable the NAND gate G4 of the clock 70-3. The internal NAND gate G1 of the clock 70-3 has both of its inputs 1 and 2 tied together, so that when the input signal is at a relatively zero level, its output is at the $V_{DD}$ level, producing a zero level at the output of the second clock NAND gate G4.

However, the output of the clock NAND gate G4 is tied to the internal gate G1 through a capacitor C3. This causes a pulsation in the clock circuit 70-3 with a duty cycle determined by resistors $R_9$ and $R_{10}$, acting in conjunction with a diode $D_6$. The result is the production of pulses with a width $T_1$ and an interval $T_2$. The interval is controlled by the resistors $R_9$ and $R_{10}$ acting with the capacitor C3. The pulse width is determined by the resistor $R_{10}$ acting with the steering diode $D_6$ which bypasses the resistor $R_9$.

The pulsing output from the NAND gate G4 controls the counter 70-2. When the counter reaches the count of the stage determined by the switch 17, a bias level signal now appears at pin 9 of the NAND gate G3 and pin 5 of NAND gate G2. Because of the pulses that continue to be applied from the clock NAND gate G4, there is a pulsating output from gate G3. This causes the silicon controlled rectifier $SCR_1$ of the diode bridge to operate intermittently.

After a further counting period, illustratively 32, a bias level signal appears at pin 4 of the counter chip $Z_1$ and thus at input terminal 6 of the second gate G2. The simultaneous presence of two input bias level signals at the NAND gate G2 produces a low level output that terminates the enablement of the clock NAND gate G4. The result is that no further counting takes place and a zero level output is produced at pin 10 of gate G3. This terminates the operation of the silicon-controlled rectifier $SCR_1$ of the diode bridge.

Thus once the specified count of the counter 70-2 has been reached, subsequent pulsing causes a blinking effect, i.e. causes the triac to turn "off" and "on" at a rapid rate. If the load consists of lights, they are pulsed and caused to blink, indicating that the circuit is about to shut down.

Figure 3B:
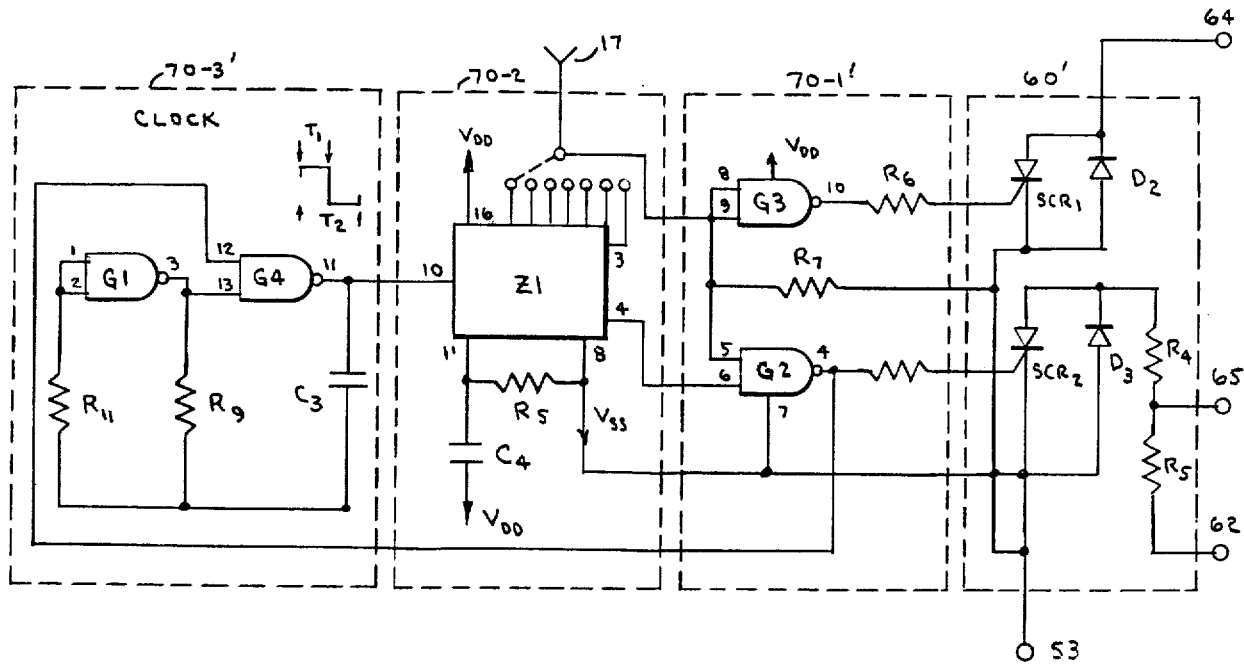
FIG. 3B is an alternative type of control circuitry for the electrical control system of FIGS. 1 and 2.

An alternative high-power gating bridge circuit 60' for controlling the triac 40 is shown in FIG. 3B. Biasing of the control circuitry is the same as for FIG. 3A, with the biasing circuit being completed through the bridge diode $D_2$ on positive half cycles of the signal applied to the printed circuit board terminal 33.

Instead of having a shunting silicon-controlled rectifier, the bridge of FIG. 3B includes separate silicon-controlled rectifiers $SCR_1$ and $SCR_2$ in respective legs of the bridge. These rectifiers $SCR_1$ and $SCR_2$ are separately operated from the remainder of the control circuit so that when one of the silicon-controlled rectifiers is turned off, e.g. $SCR_1$ or $SCR_2$, there will be current flow through the triac 40 only on half cycles of the source voltage S. This reduces the power level to the load L which, in the case of a light bulb, for example, is at half effective level, causing the filaments to be reduced in illumination intensity. Eventually, when the second silicon-controlled rectifier $SCR_1$ or $SCR_2$ is turned off, the triac 40 is no longer biased for conducting and it becomes an open circuit, terminating the flow of current to the load.

In particular the NAND gate G3 controls one of the silicon-controlled rectifiers $SCR_1$, while the second NAND gate G2 controls the second silicon-controlled rectifier $SCR_2$. The pins 8 and 9 of NAND gate G3 are tied together, so that before the desired count is reached the output at pin 10 of gate G3 is at the level $V_{DD}$. This causes the silicon-controlled rectifier $SCR_1$ to be operated. Similarly, the gate G2 for the second silicon-controlled rectifier $SCR_2$ is also operated. Consequently, when the toggle 21 is closed, and the bias circuitry operated, the voltage $V_{DD}$ appears almost immediately at the outputs of the respective gates G2 and G3, actuating associated silicon-controlled rectifiers $SCR_1$ and $SCR_2$. The triac 40 is then biased in its "on" condition and able to pass alternating current to and from the load.

However, when the desired count is reached, based on a square wave signal produced by the clock gates G1 and G4, a voltage $V_{DD}$ appears at input pins 8 and 9 of gate G3, causing the output to go to a zero level. This disables the first silicon-controlled rectifier $SCR_1$ and permits only one half of the bridge to be active. Subsequently when the other gate G2 has a $V_{DD}$ level applied to its input pin 6 its output also goes low, disabling the second silicon controlled rectifier $SCR_2$ which brings about a disablement of the entire bridge circuitry and thus terminates the operation of the switch.

Figure 4A:
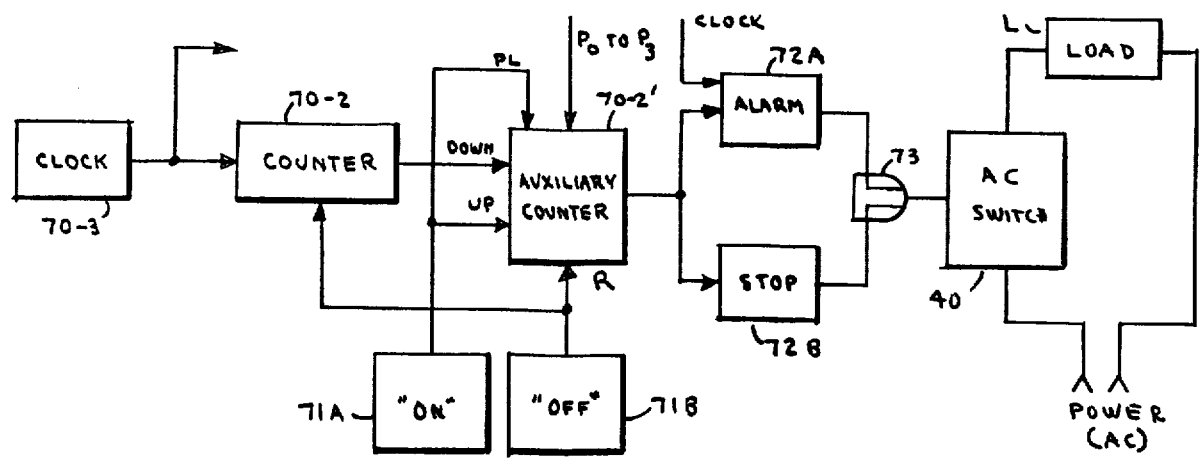
FIG. 4A is a block and schematic diagram of an alternative electrical control system in accordance with the invention.
Figure 4B:
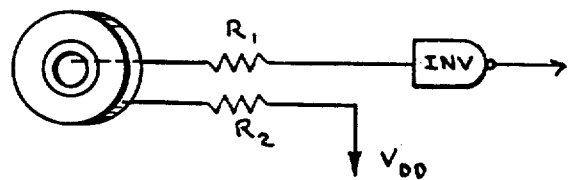
FIG. 4B is a schematic representation of an illustrative control switch for the system of FIG. 5A.

A further embodiment of the invention is shown in FIG. 4A which is similar to that previously discussed except for the employment of a second counter 70-2' in conjunction with "on" and "off" switches 71A and 71B of the kind shown in FIG. 4B. In the prior embodiment of FIGS. 3A and 3B the counter 70-2 increments until the alarm and stop times are decoded. In the embodiment of FIG. 4A the second counter 70-2', which can be a binary up-down counter of the type CD40193, uses pulses as a down count and decodes the output to provide the alarm and stop conditions for alarm and stop units 72A and 72B, which act on the triac 40 through an OR gate 73.

The "on" switch is used to load a pre-set initial value in the counter 70-2' by way of parallel data inputs P-O to P-3. Each "on" closure provides an additional up count. As indicated in FIG. 4B, the "on" and "off" switches 71A and 71B can be the input gates of metal-oxide-silicon integrated circuits which are enabled by conductive paths provided by the finger of the user.

In addition the circuitry of FIG. 4A has been modified to allow for initial reset of the counter 70-2 when the power is turned on. This allows switch activation with an in-line interruption switch, i.e. one with contact closure, which is the kind normally installed for lighting.

Figure 5A:
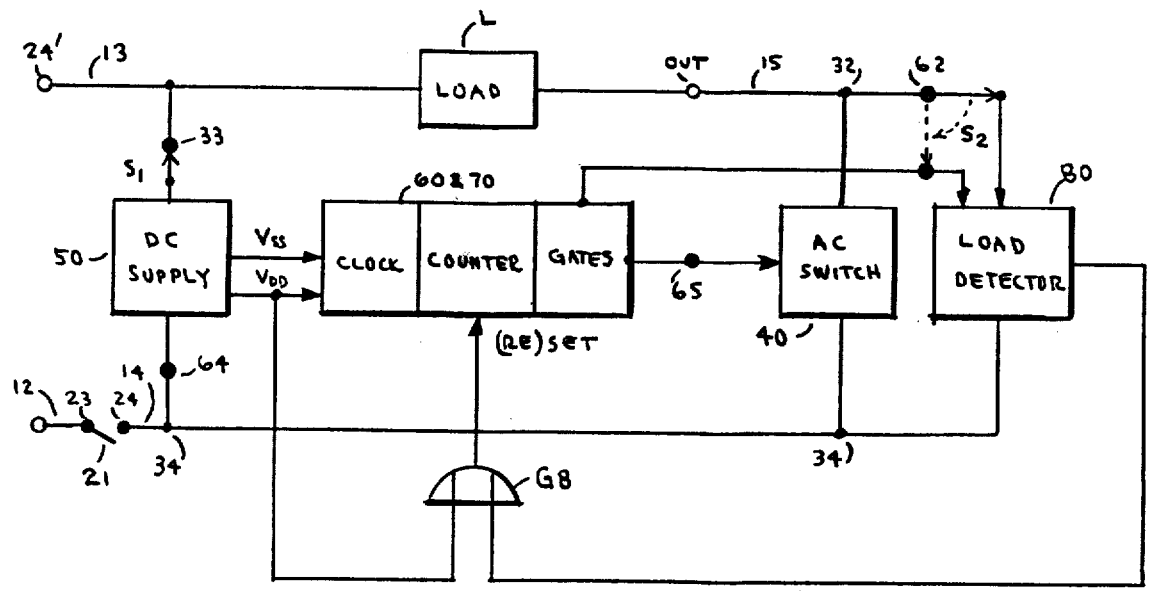
FIG. 5A is a generalized block diagram of an electrical control system in accordance with the invention, including a separate load detector.

A generalized configuration of the invention employing a load detector 80 is shown in FIG. 5A. The controller 60 & 70 includes a clock, a counter, and control gates of the kind discussed previously. The controller 60 & 70 operates an electronic switch 40 which extends between terminals 32 and 34. One terminal 32 of the switch 40 extends to a load L through a lead 15. The other terminal 34 of the swtich 40 extends to a line terminal 24. The other terminal 24' of the line extends to the load.

In the particular embodiment of FIG. 5A a power supply 50 extends between the line terminals 24 and 24' through a closed switch S1. It will be understood that the supply can be provided by any suitable source, including batteries, in which case switch S1 is opened. In addition the supply 50 illustratively has leads $V_{SS}$ and $V_{DD}$ for the controller 60 & 70. It will be understood that where non-CMOS elements are employed in the controller, the bias source is modified accordingly. In addition the bias supply can be used to trigger the controller for reset through an OR gate 68. Alternatively the controller can be reset using the load detector 80. The latter assures that resetting will take place when the switch 40 is operated to afford precision in the operation of the controller. Accordingly the load detector 80 is used to provide an indication when there has been a suitable change in the signal level of the load, indicating whether or not the electronic switch 40 has been operated. The load detector 80 can be switched out using the switch S2, in which case the system can be modified according to FIG. 2.

Figure 5B:
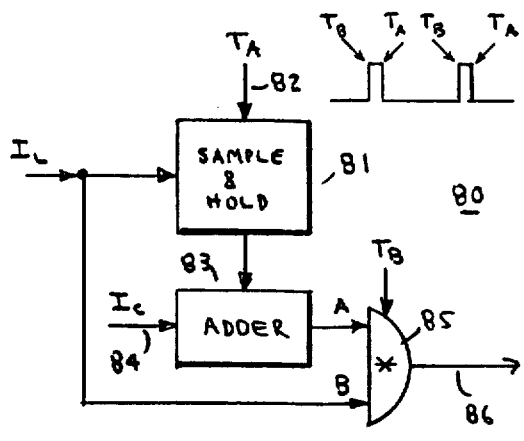
FIG. 5B is a block diagram of a load detector for the generalized control system of FIG. 5A.

An illustrative load detector 80 is shown in FIG. 5B. The particular detector 80 of FIG. 5B includes a sample and hold circuit 81 of conventional construction which is gated at time $T_A$ from the controller at a terminal 82. The sample and hold circuit 81 takes a sample corresponding to the signal passing through the load. This sample is supplemented by a prescribed level at terminal 84 in an adder 83. The output is then compared in a comparator 85 with subsequent levels corresponding to the load signal. When the magnitude of the subsequent signal exceeds the supplemented sample, a triggering resetting signal appears at terminal 86' to signal the controller that the electronic switch 40 has been operated and that the precision time control over switch operation is to be initiated.

Figure 5C:
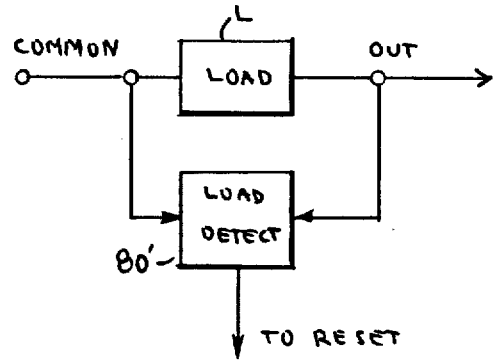
FIG. 5C is a block diagram of an alternative load detector arrangement for the system of FIG. 5A.

Instead of having the detector 80 in series with the load it may also be in parallel as illustrated for the particular detector 80' of FIG. 5C.

Figure 6:
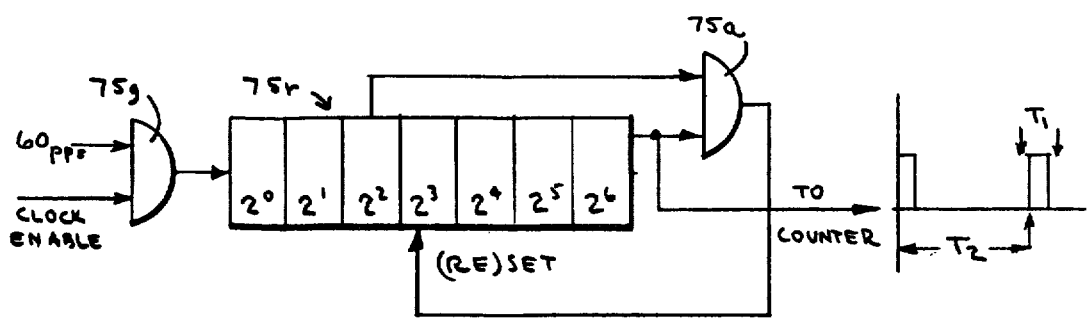
FIG. 6 is a block diagram of an alternative clock circuit for the systems of FIG. 2 and 5A.

In addition, as an alternative to the clock circuits 70-3 and 70-3' of FIGS. 3A and 3B, with their internal resistor and capacitor timing elements, external timing may be provided by the special clock circuit 75 of FIG. 6. The clock 75 makes use of a multi-state register 75r which is energized from an AND gate 75g with power line and enablement terminals. The clock 75 includes a reset AND gate 75a which responds to the final output signal and an intermediate signal to produce a reset for an intermediate state, producing a pulse train similar to that provided by the clock 70-3 of FIG. 3A.

It will be understood that the clock 75 is employed with an enablement gate, such as the gate G4, if the remaining circuitry of FIG. 3A is to be used.

Illustratively the register 75 has seven stages. In the case of energization from a 60-cycle power line, the seventh stage goes "up" after 2.133 seconds. The third stage which provides the other enablement for the output AND gate 75a goes "up" after an additional 0.133 seconds. The pulse width is thus 0.133 seconds and the pulse interval is 2.133 seconds.

Figure 7:
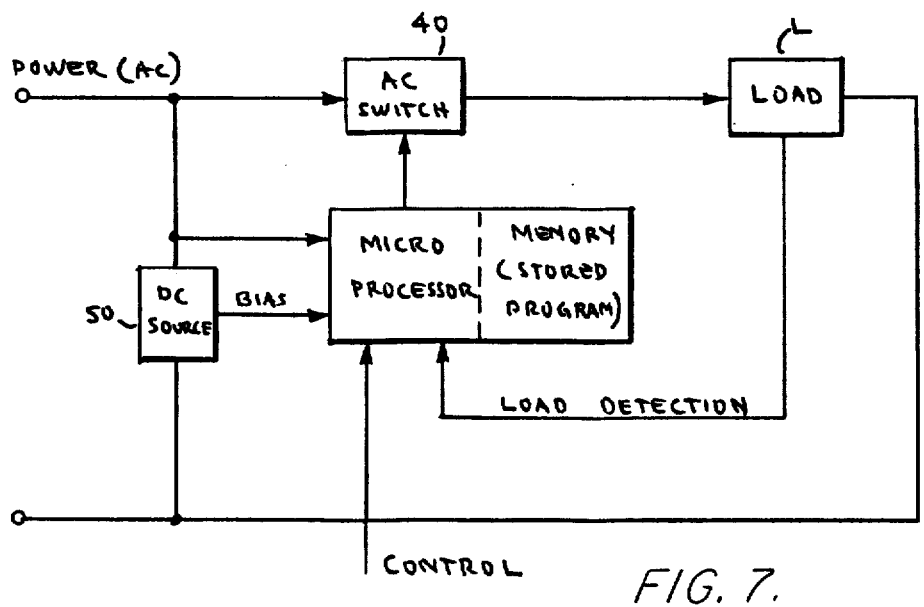
FIG. 7 is a block diagram of an electrical control system according to the invention employing a microprocessor with stored program control.

Another embodiment of the invention is shown in FIG. 7 where the controller 60 & 70 takes the form of a microprocessor with a stored program. The microprocessor is powered from a bias source 50 of the kind previously used, which may be battery operated. Load detection can be used to reset the microprocessor at a suitable time, and the ensuing operation is as discussed previously.

While various aspects of the invention have been set forth by the drawings and specification, it is to be understood that the foregoing detailed description is for illustration only and that various changes in parts, as well as the substitution of equivalent constituents for those shown and described may be made without departing from the spirit and scope of the invention as set forth in the appended claims.

What is claimed is:

1. An electronic controlled system comprising
   an electronic switch;
   means for controlling said electronic switch for a prescribed time interval;
   means for biasing the controlling means; and
   means for connecting said electronic switch in a first circuit with an energy source and a load and simultaneously connecting said controlling means in a second circuit with said energy source and said load for triggering said controlling means for each operation of the connecting means for said prescribed time interval.

2. A system as defined in claim 1 wherein said electronic switch is a triac having a control terminal which is connected to said controlling means.

3. A system as defined in claim 1 wherein said controlling means includes a counter which is set by setting means and operates said electronic switch.

4. A system as defined in claim 3 wherein said counter operates said electronic switch through a pair of gates.

5. A system as defined in claim 4 wherein one of said gates operates for said prescribed interval and the other of said gates operates for less than said prescribed interval.

6. A system as defined in claim 1 wherein said controlling means includes first means for operating said electronic switch for said prescribed interval and second means for operating on said electronic switch for less than said prescribed interval.

7. A system as defined in claim 6 wherein the first operating means terminates the operation of said electronic switch at the end of said prescribed interval and the second operating means produces a variation in the operation of said electronic switch between the beginning of said interval and the end thereof.

8. A system as defined in claim 7 wherein said second operating means produces a repetitive interruption in the operation of said electronic switch.

9. A system as defined in claim 8 wherein said electronic switch is capable of passing positive and negative signal levels and one of said levels is blocked by said second operating means.

10. A system as defined in claim 8 wherein said electronic switch is capable of passing positive and negative signal levels and each such level is periodically interrupted by said second operating means.

* * * * *